United States Patent [19]

Salvaudon et al.

[11] 4,190,837
[45] Feb. 26, 1980

[54] SYSTEM FOR PROTECTING A VEHICLE-BORNE TRACKING RADAR AGAINST AN OFF-TARGET JAMMER

[75] Inventors: Laurence Salvaudon; Jean-Claude Charlot, both of Paris, France

[73] Assignee: Thomson-CSF, Paris, France

[21] Appl. No.: 915,983

[22] Filed: Jun. 16, 1978

[30] Foreign Application Priority Data

Jun. 17, 1977 [FR] France ............................. 77 18621

[51] Int. Cl.² .......................... G01S 9/22; G01S 7/36
[52] U.S. Cl. .............................. 343/16 M; 343/18 E
[58] Field of Search .......................... 343/16 M, 18 E

[56] References Cited

U.S. PATENT DOCUMENTS 4,107,682  8/1978  Boucher et al. ............... 343/18 E X Primary Examiner—T.H. Tubbesing
Attorney, Agent, or Firm—Karl F. Ross

[57] ABSTRACT

A protective system for a vehicle-borne tracking radar, designed to counter the effect of an off-target jammer whose interfering signals are picked up by a directive antenna together with echoes from an actual target, comprises a receiver with a sum channel and a difference channel. In the absence of a jammer, the sum channel is connected via a signal processor to telemetric circuitry in the radar associated with the vehicular guidance system which keeps the antenna axis trained upon the target as the vehicle homes in on same. When a strong jamming signal is detected, a switching device in the processor cuts off the sum channel from the telemetric circuitry and supplies the latter, instead, with rectified error signals from the difference channel, these error signals being also delivered prior to rectification to a tracking-control circuit which energizes an antenna rotator to hold its axis in line with the jammer. The presence of a jammer may be detected by a signal-level comparator with two circuit branches connected to the sum channel, these branches including respective integrators which are alternately supplied with incoming signals in a target window and in a jammer window occurring at different instants of a recurrence period. Another possible jammer-signal detector, which may be included in the processor, receives the rectified error signal from the difference channel in the target window and produces a "jammer present" signal whenever the accumulated error signals exceed a predetermined threshold.

12 Claims, 7 Drawing Figures

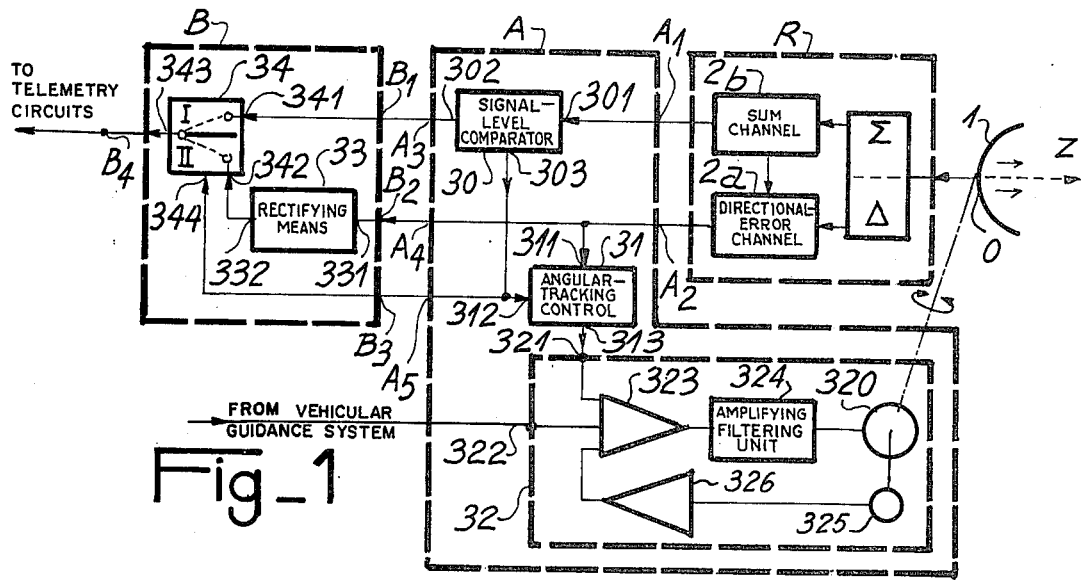
Fig_1
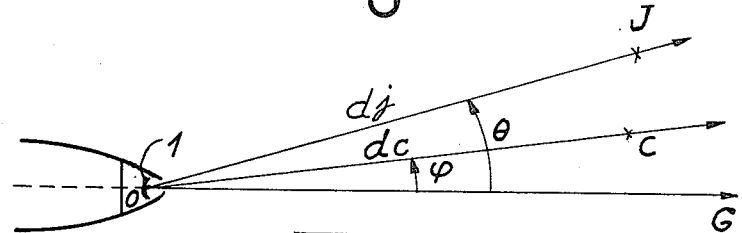
Fig_3
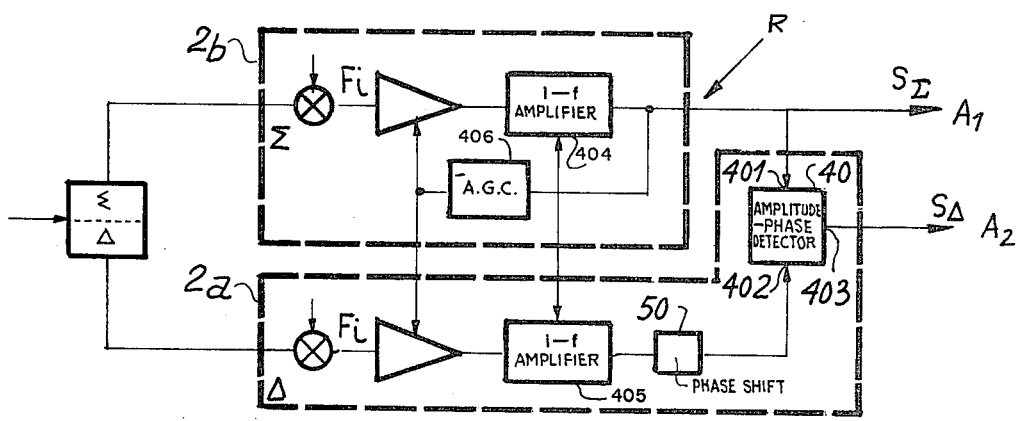

Fig_4
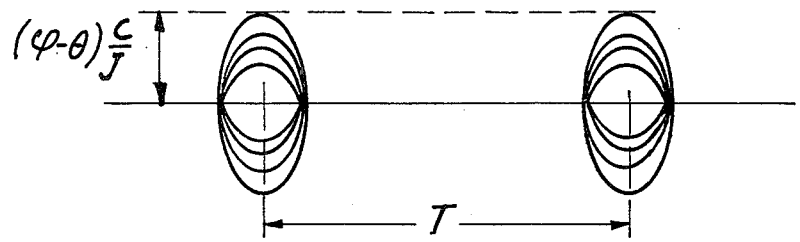
Fig_5
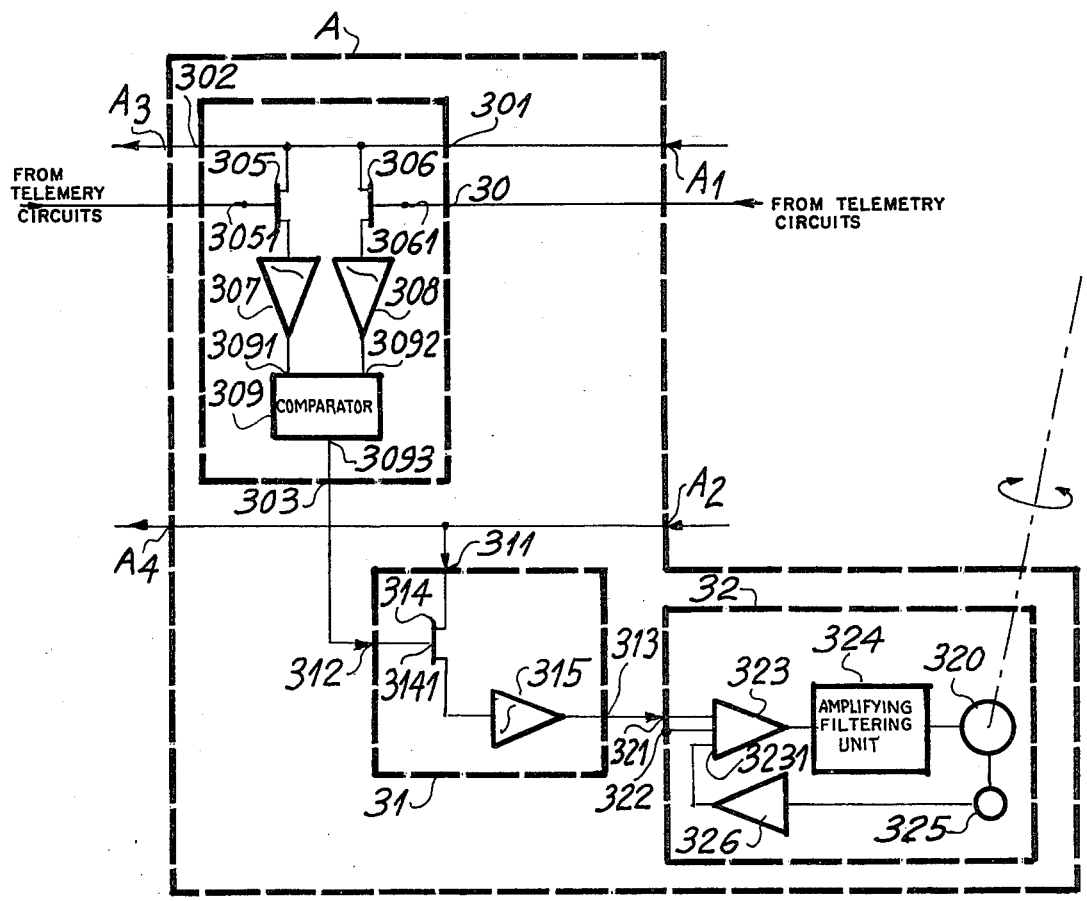

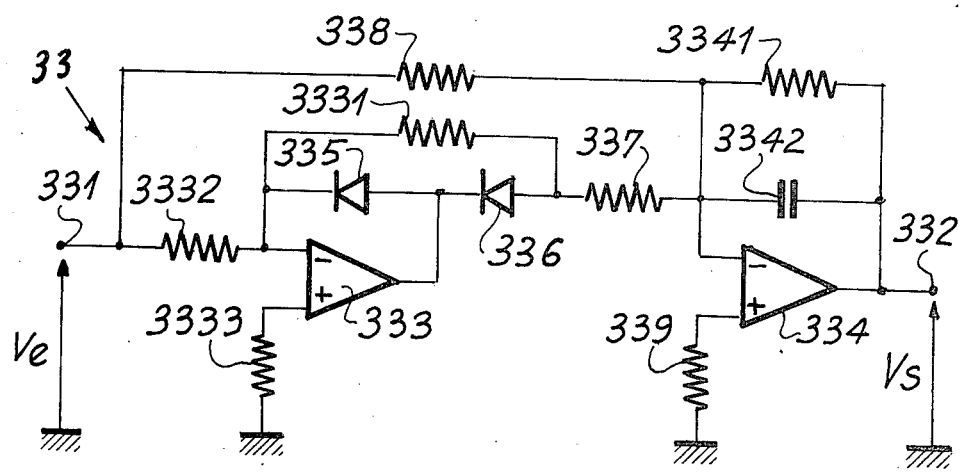
Fig_6
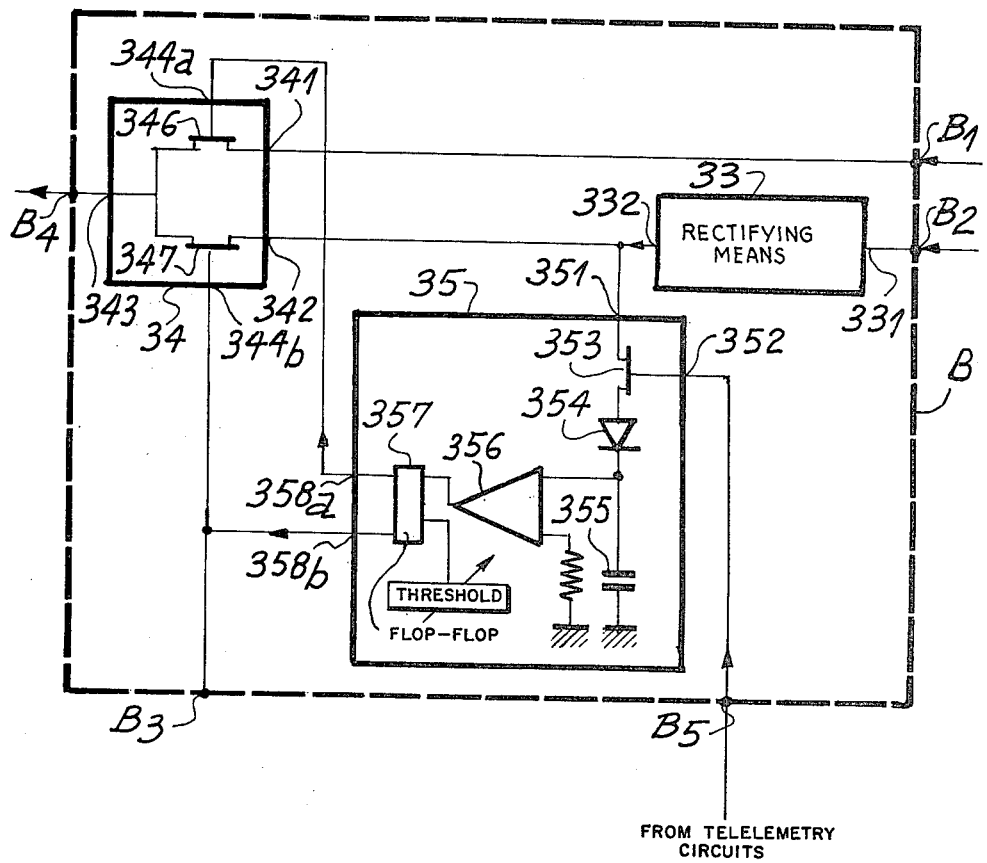
Fig_7

SYSTEM FOR PROTECTING A VEHICLE-BORNE TRACKING RADAR AGAINST AN OFF-TARGET JAMMER

FIELD OF THE INVENTION

Our present invention relates to a system for protecting a vehicle-borne tracking radar against an off-target jammer.

BACKGROUND OF THE INVENTION

Tracking radars used in special carrier vehicles enable these vehicles to home in on a given target. The presence of an off-target jammer, i.e. a jammer which is not carried by the target itself, is intended to prevent the carrier from reaching its target. These devices are particularly troublesome where they consist of active jammers which emit a very strong, continuous signal modulated in frequency in the frequency range generally used by the homing-type guidance systems. The signal emitted by the jammer does not bear any definite phase or amplitude relationship with the signal generated by the radar of the guidance system and reflected by the target. The guidance systems normally employ tracking radars comprising an antenna which supplies an amplitude or phase zero in a given direction known as the antenna axis. The antenna of this type of radar is associated with a receiver which comprises on the one hand a directional-error or difference channel $\Delta$, delivering a signal proportional to the amplitude or phase difference between the signals generated for directions of wave propagation other than that of the axis of the antenna, and on the other hand a sum channel $\Sigma$ delivering information relating to the signal strength received from both the jammer and the target. On account of the presence of the jammer radiation, the resulting signals are fluctuating and the guidance system is incapable of exploiting the information emanating from the weakest source, namely the target.

OBJECT OF THE INVENTION

The object of our present invention is to provide means for protecting the guidance system of a vehicle-borne tracking radar against the influence of jammers of the type referred to, thereby enabling this system to exploit the information emanating from the target in the presence of such a jammer.

SUMMARY OF THE INVENTION

This object is realized, in accordance with our present invention, by the provision of a receiver with a sum channel and a difference channel (also referred to as a directional-error channel) connected to an orientable directive antenna whose axis is trainable by the vehicular guidance system upon a target to be tracked, the difference channel emitting an error signal in the presence of radiation incoming in a direction which deviates from the antenna axis. The antenna is coupled for this purpose with positioning means serving to rotate its axis in a predetermined plane (usually the azimuthal plane), the positioning means being responsive not only to signals from the guidance system but also to normally deactivated tracking-control means independent of that system inserted between the positioning means and the difference channel of the receiver. The presence of interfering signals from an off-target jammer is ascertained by detector means connected to the output of one of the two channels whereupon a switchover device, connecting the telemetric circuitry of the radar to an output of the sum channel in a normal position, is placed in an alternate position in which an output of the difference channel is connected to that circuitry; at the same time, activation of the tracking-control means by the detector causes the transmission of an error signal from the difference channel to the positioning means, thereby training the antenna axis upon the jammer.

Pursuant to a more particular feature of our invention, the detector may comprise a signal-level comparator connected to the output of the sum channel ahead of the switchover device and controlled by the telemetric circuitry of the radar for separately accumulating echo signals received in a target window and interfering signals received in a jammer window in a recurrence period of radar emission. The level comparator emits a "jammer present" signal whenever the accumulated interfering signals exceed the accumulated echo signals.

Another type of detector usable in our protective system comprises a sampler of error signals such as a storage capacitor which is connected, with the aid of switch means controlled by the telemetric circuitry of the radar, to the output of the difference channel by way of rectifying means and during periods corresponding to a target window in the aforementioned recurrence period, a bistable comparator being flippable by the sampled error signals whenever their magnitude exceeds a predetermined threshold.

Circuitry of the type described may be used for protecting any goniometry or radar systems comprising a directional-error or difference channel and a sum channel, especially amplitude or phase systems of the monopulse type, against off-target jammers. They are particularly suitable for detecting marine targets in the presence of such a jammer.

BRIEF DESCRIPTION OF THE DRAWING

The above and other features of our invention will be better understood from the following description given in conjunction with the accompanying drawing wherein:

FIG. 1 is a synoptic diagram of a protective system according to our invention;

FIG. 2 is a diagram showing the various parameters involved in the orientation of the antenna of a radar embodying our invention;

FIG. 3 shows a specific embodiment of a radar receiver forming part of the system according to the invention;

FIG. 4 shows a video-frequency signal delivered by a receiver of the type shown in FIG. 3;

FIG. 5 shows details of a control unit included in the system of FIG. 1; and

FIGS. 6 and 7 show details of other components of the system illustrated in FIG. 1.

SPECIFIC DESCRIPTION

A protective system according to our invention as illustrated in FIG. 1 protects a radar, having an antenna 1 associated with a receiver R comprising a directional-error or difference ($\Delta$) channel 2a and a sum ($\Sigma$) channel 2b, against an off-target jammer. For a direction of wave propagation corresponding to an axis OZ of the antenna, the radar system supplies on the $\Delta$ channel a highly attenuated signal which may be considered as zero in comparison with the corresponding signal for the same direction of the $\Sigma$ channel. The system additionally comprises a servocontrol unit A for reorienting the axis OZ of the antenna, e.g. in azimuth, toward the jammer when the latter delivers a signal having a higher level than a useful signal from the target itself. The servocontrol unit A includes a signal-level comparator 30 with an input 301 connected by a terminal $A_1$ to the output of the sum channel $2b$ of the receiver and a first output 302 which, in operation, carries the video-frequency signal of the sum channel. A second output 303 of comparator 30 carries a control signal in the presence of jamming. The servocontrol unit A further includes an angular-tracking-control circuit 31 with a first input 311 connected by a terminal $A_2$ of unit A to the difference channel $2a$, a second input 312 connected to the output terminal 303 of comparator 30, and an output terminal 313. A position-control loop 32 of unit A comprises a motor 320 which drives the antenna 1 in the angular-tracking direction, here assumed to be azimuthal, via a mechanical connection indicated by a dot-dash line. The position-control loop 32 has an input 321 connected to the output 313 of the tracking-control circuit 31.

A unit B processes the useful signal appearing on the $\Delta$ channel $2a$ upon the orientation of the antenna axis toward the jammer. This processor B includes rectifying means 33 having an input 331 and an output 332. The input 331 of the rectifying means 33 is connected by respective terminals $B_2$ and $A_4$ of the units B and A to the output of channel $2a$. Unit B further includes a switchover device 34 having a first signal input 341 connected by respective terminals $B_1$ and $A_3$ to the output 302 of level comparator 30 delivering the video-frequency signal of the sum channel, a second signal input 342 connected to the output 332 of the rectifying means 33 and a control input 344 connected by terminals $B_3$ and $A_5$ of units B and A to the output terminal 303 of the level comparator 30. An output 343 of switchover device 34 connected to an output $B_4$ of the processor B emits the useful signal in the presence or absence of an off-target jammer, output $B_4$ being connected to conventional range-finding and range-tracking telemetry circuits not shown. These circuits are of the type normally used in radar-signal processors.

The operation of the assembly of FIG. 1 will now be described with reference to the plane representing the relative orientations of the carrier, the target and the jammer shown in FIG. 2. Before detection of the target C, the carrier is oriented on a line OG corresponding to a gyroscopic direction of its guidance system. When the target C is detected by the guidance system, the axis OZ of the antenna is rotated toward that target. This positioning is effected by the homing circuits of the radar, e.g. in conjunction with conventional telemetry circuits. The guidance system then completes a range-finding sequence; an echo detector compares the signal strengths received in a target window and in a clutter window, i.e. searches in the target window for a signal having a strength exceeding by at least 9 dB, for example, the level of the clutter and noise signal contained in the other window. The presence of an echo signal stops the range-finding sequence and closes a range-tracking loop for the target C. At this moment, the switchover device 34 of the processor B is in position I, the output signals of the sum channel being delivered by the terminal $B_4$ to the nonillustrated telemetry circuits of the radar.

In the example shown in FIG. 2, the target direction OC includes an angle $\phi$ with the gyroscopic direction OG. Upon the appearance of a jamming signal from a source J, the level of that signal—if above the level of the target signal—causes the range-tracking loop to be disconnected from the associated telemetry circuits. The sum channel $2b$ carries the echo signal reflected by the target upon which the interfering signal of the jammer J is superposed when the latter is of the active type emitting a continuous signal. At its output terminal 303, level comparator 30 connected to the sum channel $2b$ delivers a "jammer present" signal on the one hand to the input 312 of control circuit 31 and on the other hand to the control input 344 of the switchover device 34. At its output terminal 313, the control circuit 31 emits a corrective signal proportional to the integral of the error signal delivered by the difference channel $2a$ in the presence of the jammer. This corrective signal is fed to the input 321 of the position-control loop 32 and, through the motor 320, reorients the axis OZ of the antenna 1 toward the jammer J. The signal of the jammer on the difference channel is thus suppressed or highly attenuated in relation to any signal emanating from an azimuthal direction offset from antenna axis OZ and particularly in relation to the signal reflected by the target, the line OC including an angle $\theta - \phi$ with the axis OZ of the antenna now trained upon the jammer J. Concurrently, the signal representative of the presence of the jammer causes the switchover device 34 to change from position I to position II for delivery of the output signal of channel $2a$ to the output $B_4$ of the processor B. The corresponding video-frequency signal emitted by the output $B_4$ is applied to the input of the telemetry circuits (not shown). The guidance system thus completes a range-tracking sequence on the target under surveillance despite the presence of the jammer and the signals which it emits. As the carrier approaches the target, the level of the signal reflected by the target and received by the carrier increases more rapidly, in dependence upon the distance dc of the carrier from the target, than the level of the signal of the jammer. The law of variation of the target-signal level and that of the jammer-signal level is respectively proportional to $1/dc^4$ and to $1/dj^2$, dj being the distance of the carrier from the jammer. On a given point of the trajectory of the carrier, the level of the signal reflected by the target becomes greater than the level of the signal emitted by the jammer. Taking into account the provision of a predetermined safety threshold, the guidance system is no longer jammed beyond this point and the difference signal in the target window is representative of the directional error relative to the target. The training of the axis OZ of the antenna upon the target is then effected by the guidance system which enables the carrier to reach its destination represented by the target.

Our improved system is particularly suitable for operation in conjunction with an amplitude or phase radar of the monopulse type. If the receiver R is of the AGC (automatic gain control) type, the signal on the sum channel is proportional to the sum of the jamming signal $\vec{J}$ and the echo signal $\vec{C}$ reflected by the target, i.e. $S_\Sigma = K(\vec{J} + \vec{C})$. On the difference channel, the signal obtained has the form $S_\Delta = \theta + \phi \cdot (C^2/J^2) + (\theta + \phi) \cdot (C/J) \cos(\vec{J}, \vec{C})$ where C and J represent the respective amplitudes of the target signal $\vec{C}$ and the jammer signal $\vec{J}$ received by the radar. The term $\theta + \phi \cdot (C^2/J^2)$ is a d-c component whereas the term $(\theta + \phi) \cdot (C/J) \cos(\vec{J}, \vec{C})$ is a fluctuating quantity of maximum value $(\theta + \phi) \cdot (C/J)$. When the jammer J emits a frequency-modulated signal, the term $\cos(\vec{J}, \vec{C})$ has the form $\cos$ $[2\pi(f_j(t)-f_c)t+\psi]$ where $[2\pi(f_j(t)-f_c)t+\psi]=\gamma$ represents the momentary phase shift of the target signal $\vec{C}$ and the jammer signal $\vec{J}$, $f_j(t)$ representing the momentary frequency of the jammer signal $\vec{J}$ and $f_c$ being the frequency of the target signal $\vec{C}$. It is necessary to eliminate the d-c component $\theta+\phi\cdot(C^2/J^2)$ in cases where an AGC receiver is used in order to extract the target echo signal. In this case, which is illustrated in FIG. 3, the receiver R with its usual sum channel 2b and difference channel 2a, respectively connected to the inputs 401 and 402 of an amplitude-phase detector 40, has a phase-shifting circuit 50 added to it on one of the two above-mentioned channels. In FIG. 3, the phase-shifting circuit 50 is shown by way of example inserted in the difference channel 2a. At the level of the intermediate-frequency signals $F_i$ delivered to the phase-amplitude detector 40, circuit 50 introduces a relative phase shift of $\pi/2$ in relation to the signals of the other channel 2b. The output 403 of the amplitude-phase detector delivers a video-frequency signal $S_\Delta$ representing the error signal supplied by the difference channel 2a of FIG. 1 to input $A_2$ of control unit A whose other input $A_1$ receives the output signal of sum channel 2b. In the case of considerable carrier-target distances, for which the hypothesis of a jamming-signal level considerably higher than the target-signal level is satisfied, the video-frequency directional-error signal in the presence of the 90° phase shifter 50 has the form $S_\Delta=(\phi-\theta)\cdot(C/J)\sin\gamma$. Thus, after the antenna axis OZ has been trained upon the jammer so that $\theta=0$, we have $S_\Delta=\phi\cdot(C/J)\sin\gamma$. The video-frequency directional-error signal then comprises only a fluctuating term free from any d-c component; the relative phase shift by $\pi/2$ of the two signals of intermediate frequency $F_i$, which establishes the vectorial product of these i-f signals at the amplitude-phase detector, thus enables the d-c component to be eliminated. The video-frequency signal delivered by the output 403 of detector 40 is shown in FIG. 4 where the time T represents the recurrence period of the radar emission.

Our invention is not limited to the receiver with sum and difference channels having i-f amplifiers 404, 405 controlled by a common AGC circuit 406 in a feedback loop of sum channel 2b. It is also possible to use other receivers enabling a signal representative of the target echo to be obtained on the directional-error or difference channel. In particular, a momentary-directional-error receiver emitting signals $(\Sigma\pm j\Delta)$ yields a signal of the form $S_\Delta=2\phi\cdot(C/J)\cos\gamma$ on the difference channel. We have found that the amplitude of the fluctuating signal $S_\Delta$ is increased by 6 dB, all other things being equal, by virtue of the use of this type of receiver. This enables the acquisition of the target signal at greater range.

In one particular embodiment which is illustrated in FIG. 5, the level comparator 30 forming part of the servocontrol unit A for the reorientation of the antenna axis toward the jammer comprises a pair of circuit branches including two switches 305 and 306 whose input terminals are connected to the sum channel 2b by way of terminal 301 and whose outputs are connected to respective integrators 307, 308 working into respective inputs 3091 and 3092 of a comparison circuit 309. The output 3093 of the comparison circuit 309 is connected to the output terminal 303 of the signal-level comparator 30. The switches 305 and 306 have respective control inputs 3051, 3061 connected to the telemetry circuits of the radar (not shown). These telemetry circuits deliver to each switch a rectangular control signal corresponding, respectively, to the target window and to a jammer window, the jammer window being produced for example at the end of each recurrence period T. Each of these control signals closes the corresponding switch during the existence of the target window and of the jammer window, respectively. The integrators 307 and 308 respectively deliver to the inputs 3091 and 3092 of the comparison circuit 309 a signal representative of the mean value of the target signal, measured over several recurrence periods T, and a signal representative of the mean value of the jammer signal, again measured over several recurrence periods. At its output 3093, the comparison circuit 309 emits a "jammer present" signal. The comparison circuit 309 preferably has an adjustable threshold enabling the level of the thermal noise to be taken into consideration. The switches 305 and 306 are formed for example by field-effect transistors.

The construction of the level comparator 30 is by no means limited to the embodiment described above. We may, for instance, associate the receiver with a jammer channel tuned to a frequency band wider than the bandwidth of the receiver itself. Thus, it is possible by analyzing the amplitude level outside the bandwidth of the receiver to detect the existence of a frequency-modulated jammer for signal amplitudes above a given threshold.

In the embodiment shown in FIG. 5, the angular-tracking-control circuit 31 comprises an electronic switch 314 formed, for example, by a field-effect transistor having a gate 3141 connected to the input 312 of circuit 31 and drain and source electrodes respectively connected by the terminal $A_2$ of unit A to the output of the difference channel 2a (FIG. 1) and through an integrator 315 to the output terminal 313 of circuit 31. The "jammer present" signal delivered by the output terminal 303 of the signal-level comparator 30 causes the input terminal 321 of the servocontrol loop 32 to be connected to the output of the difference channel 2a by the closure of the normally open electronic switch 314. The output of channel 2a thus delivers to the input terminal 321 of the servocontrol loop 32 the video-frequency signal of this channel which is used as a control signal for loop 32 after integration over several recurrence periods T and emission of the mean value of the video-frequency directional-error signal by the integrator 315. In FIGS. 1 and 5, the servocontrol loop 32 comprises a summing amplifier 323 connected to the drive motor 320 by an amplifying and filtering unit 324. The feedback branch of the servocontrol loop 32 includes a position detector 325 connected to a variable-gain amplifier 326. The output of the amplifier 326 is connected to an inverting input 3231 of amplifier 323 which also has an input connected to a terminal 322 of the position-control loop 32. The terminal 322 is connected to the circuits of the guidance system delivering a signal representative of the gyroscopic direction OG shown in FIG. 2. The servocontrol loop 32 may also form part of the homing circuits of the radar system.

In FIG. 6, the rectifying network 33 is designed as a full-wave rectifier with two operational amplifiers 333 and 334 each having an output, a noninverting input (+) and an inverting input (−). The output of the amplifier 333 is regeneratively connected by a diode 335 to the inverting input of this same amplifier and is further connected to the inverting input of the amplifier 334 by a diode 336 in series with a resistor 337. The diodes 335 and 336 are series-connected in the same forward direction (thus in copolar relationship) and are shunted by a resistor 3331. The inverting input of the amplifier 334 is connected, on the one hand, by a resistor 338 to the terminal 331 of the rectifier network 33 and, on the other hand, by a feedback circuit formed by a resistor 3341 in parallel with a capacitor 3342 to the output of the amplifier 334 whose output is connected to the output terminal 332 of network 33. The noninverting inputs of the amplifiers 333 and 334 are connected to the system ground via respective resistors 3333 and 339. The inverting input of the amplifier 333 is connected to the terminal 331 of the network by a resistor 3332. The resistors 3333 and 337 may have identical magnitudes; the same applies to the resistors 3331, 3332, 338 and 3341.

As will be apparent from FIG. 6, an input signal $V_e$ on terminal 331 (originating at the difference channel 2a of FIG. 1) is applied to the inverting inputs of the cascaded operational amplifiers 333 and 334 by way of resistors 3332 and 338, respectively, the inverting input of amplifier 334 also receiving the output signal $V_s$ from terminal 332 by way of an R/C network constituted by the resistor 3341 and the capacitor 3342. Resistors 3332 and 338 constitute a voltage divider in parallel with another voltage divider consisting of the shunt resistor 3331, bridging the cascaded diodes 335, 336, and the resistor 337 in series therewith.

In one advantageous embodiment, which is illustrated in FIG. 7, processor B comprises a circuit 35 for detecting the presence of jamming on the directional-error channel. This circuit has a first input 351, a second input 352 and two outputs 358a, 358b. It further comprises a switch formed by a field-effect transistor 353 whose control electrode or gate is connected to the second input 352 of the circuit 35 and whose source is connected to the first input 351. The drain of the FET 353 is connected to a peak-value sampling circuit formed by a diode 354 connected to a capacitor 355 which, when charged to the peak value of the rectified signal, stores this value for the duration of each recurrence period T. The capacitor 355 is grounded and its junction with diode 354 is connected to an input of an operational amplifier 356. The latter, in turn, works into a bistable threshold device 357 with two complementary outputs 358a and 358b. Device 357 has an adjustable threshold which enables existing noise to be taken into consideration. The signal stored on capacitor 355 is compared with the threshold of device 357 and, on reaching a level higher than the threshold, causes a flip-flop in that device to change state and a logical "jamming present" signal to appear at the outputs 358a and 358b of the circuit 35. The absence of jamming corresponds to a signal inversion at each of the outputs 358a and 358b. Circuit 35 is activated by turning on the FET 353 via input 352 which is connected by way of a terminal B$_5$ to the telemetry circuits of the radar (not shown) and carries a control signal corresponding to the target window.

In FIG. 7, the switchover device 34 is shown to comprise two switches 346 and 347 respectively connected between the input terminals 341 and 342 and the output terminal 343 of this device. Each switch 346 and 347 has a control electrode connected to a first control terminal 344a and to a second control terminal 344b, respectively. The outputs 358a and 358b of the detection circuit 35 are respectively connected to these control terminals 344a and 344b. In operation, the change of state of the bistable threshold device 357 results in the alternate closure of switches 346 and 347 and the appearance on output B$_4$ of the video-frequency signals of the sum channel in the absence of a jamming signal or the emission of the rectified video-frequency signals of the difference channel in the presence of a jamming signal. The level comparator 30 shown in FIG. 1 may be omitted and replaced by a connection of, e.g., the terminal 358b of circuit 35 to the terminal B$_3$ of processor B, the appearance of a "jammer absent" signal on terminal 358b causing the angular-tracking-control circuit 31 to be restored to normal.

With the system described above we have been able to obtain the following results in a radar with the test parameters given below:

Characteristics of the guidance system:
  Transmission power 65 KW.
  Antenna gain of the guidance system: 21 dB.
  Wavelength of the signal transmitted by the guidance system: $\lambda = 3$ cm.
Characteristic of the target:
  Equivalent surface area of the target: 3000 m$^2$.
Characteristic of the jammer:
  Transmission power: 1600 W.

For particular jammer/guidance-system distances of 1 km, 2 km, 3 km and 4 km, the observed target-detection zones were approximately in the form of two circular sectors symmetrical in relation to the antenna axis OZ—directed toward the jammer—for a selected distance. Each sector was approximately bounded in azimuth by lines including angles of the order of 1° and 9° with the axis OZ and in range by curves dependent upon the jammer/carrier distance selected and the angle of the direction of wave propagation relative to the axis OZ.

The protective system according to our invention is by no means limited to azimuthal angular tracking; extraction of bipolar angular information is possible simply by duplicating the circuits.

What is claimed is:
1. In a vehicle-borne tracking radar including telemetric circuitry associated with a vehicular guidance system for steering the vehicle toward a target, the radar being provided with an orientable directive antenna having an axis trainable by said guidance system upon the target in response to incoming echo signals, the combination therewith of:
  a receiver provided with a sum channel and a difference channel connected to said antenna, said difference channel emitting an error signal in the presence of radiation incoming in a direction deviating from said axis;
  positioning means coupled with said antenna for rotating said axis in a predetermined plane;
  switchover means for connecting said telemetric circuitry to an output of said sum channel in a normal position and to an output of said difference channel in an alternate position;
  normally deactivated tracking-control means independent of said guidance system inserted between said difference channel and said positioning means; and
  detector means connected to the output of one of said channels for ascertaining the presence of interfering signals from an off-target jammer and, in response to such interfering signals, changing said switchover means from said normal position to said alternate position while activating said tracking-control means to transmit an error signal from said difference channel to said positioning means, thereby training said axis upon said jammer.

2. The combination defined in claim 1 wherein said detector means comprises a signal-level comparator connected to the output of said sum channel ahead of said switchover means and controlled by said telemetric circuitry for separately accumulating echo signals received in a target window and interfering signals received in a jammer window in a recurrence period of radar emission.

3. The combination defined in claim 2 wherein said signal-level comparator includes comparison means with two inputs connected to the output of said sum channel via respective branch circuits each including a switch controlled by said telemetric circuitry.

4. The combination defined in claim 3 wherein said branch circuits further include respective integrators.

5. The combination defined in claim 1, further comprising rectifying means inserted between the output of said difference channel and said switchover means, said tracking-control means being connected to said difference channel ahead of said rectifying means.

6. The combination defined in claim 5 wherein said rectifying means is a full-wave rectifier comprising a first and a second operational amplifier connected in cascade, a pair of diodes serially connected in copolar relationship between respective inverting inputs of said operational amplifiers and bridged by a shunt resistor, said diodes and shunt resistor being separated from the noninverting input of said second operational amplifier by a series resistor, said first operational amplifier having an output connected to the junction of said diodes, said second operational amplifier having an output connected to its own inverting input through an R/C network, said full-wave rectifier having an input terminal connected to said inverting inputs via respective further resistors and having an output terminal connected to the output of said second operational amplifier.

7. The combination defined in claim 6 wherein said shunt resistor, said further resistors and the resistance of said R/C network are of the same magnitude.

8. The combination defined in claim 5 wherein said detector means comprises a sampler of error signals, a bistable comparator connected to said sampler, and switch means controlled by said telemetric circuitry for connecting said sampler to the output of said difference channel by way of said rectifying means during periods corresponding to a target window in a recurrence period of radar emission, said bistable comparator being flippable by the sampled error signals upon their magnitude exceeding a predetermined threshold.

9. The combination defined in claim 8 wherein said sampler comprises a storage capacitor connected to an input of an operational amplifier.

10. The combination defined in claim 1 wherein said sum and difference channels include respective intermediate-frequency amplifiers provided with common automatic-gain-control means, said difference channel further comprising an amplitude-phase detector with input connections to both said intermediate-frequency amplifiers, one of said input connections including a 90° phase shifter.

11. The combination defined in claim 1 wherein said receiver is of the momentary-directional-error type emitting signals $\Sigma \pm j\Delta$ where $\Sigma$ and $\Delta$ are output signals of said sum and difference channels, respectively.

12. The combination defined in claim 1 wherein said tracking-control means comprises an integrator in series with a normally open switch.

* * * * *